United States Patent
Lu et al.

(10) Patent No.: US 12,266,122 B2
(45) Date of Patent: Apr. 1, 2025

(54) METHOD FOR OBTAINING DEPTH IMAGES FOR IMPROVED DRIVING SAFETY AND ELECTRONIC DEVICE

(71) Applicant: HON HAI PRECISION INDUSTRY CO., LTD., New Taipei (TW)

(72) Inventors: Chih-Te Lu, New Taipei (TW); Chieh Lee, New Taipei (TW); Chin-Pin Kuo, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 393 days.

(21) Appl. No.: 17/896,852

(22) Filed: Aug. 26, 2022

(65) Prior Publication Data

US 2023/0394690 A1 Dec. 7, 2023

(30) Foreign Application Priority Data

Jun. 7, 2022 (CN) .......................... 202210639619.1

(51) Int. Cl.
 *G06T 7/50* (2017.01)
 *G06V 10/75* (2022.01)
 *G06V 10/98* (2022.01)

(52) U.S. Cl.
 CPC ............... *G06T 7/50* (2017.01); *G06V 10/75* (2022.01); *G06V 10/98* (2022.01); *G06T 2207/20081* (2013.01); *G06T 2207/20084* (2013.01)

(58) Field of Classification Search
 CPC ............ G06T 7/50; G06T 2207/20081; G06T 2207/20084; G06V 10/75; G06V 10/98; G06V 20/56; G06V 20/58
 See application file for complete search history.

(56) References Cited

U.S. PATENT DOCUMENTS 10,671,082 B2 * 6/2020 Huang ................. H04N 13/254

FOREIGN PATENT DOCUMENTS

CN 113724379 A 11/2021
WO WO-2022099225 A1 * 5/2022

* cited by examiner

*Primary Examiner* — Daniel G Mariam
(74) *Attorney, Agent, or Firm* — ScienBiziP, P.C.

(57) ABSTRACT

A method for obtaining depth images for improved driving safety applied in an electronic device processes first and immediately-following second images which have been captured and processes each to obtain two sets of predicted depth maps. The electronic device determines a transformation matrix of a camera between first and second images and converts the first predicted depth maps into first point cloud maps, and second predicted depth maps into second point cloud maps. The first point cloud maps are converted into third point cloud maps, and the second point cloud maps into fourth point cloud maps. First and fourth point cloud maps are matched and first and second error values are calculated, thereby obtaining a target deep learning network model. Images to be detected are input into the target deep learning network model and depth images are obtained.

20 Claims, 3 Drawing Sheets

METHOD FOR OBTAINING DEPTH IMAGES FOR IMPROVED DRIVING SAFETY AND ELECTRONIC DEVICE

This application claims priority to Chinese Patent Application No. 202210639619.1 filed on Jun. 7, 2022, in China National Intellectual Property Administration, the contents of which are incorporated by reference herein.

FIELD

The subject matter herein generally relates to a field of machine vision, in particular, relates to a method for obtaining depth images for improved driving safety and an electronic device.

BACKGROUND

In a process of automatic driving, depth images assist in monitoring pedestrians, vehicles, and obstacles around the vehicle. A number of current methods of obtaining depth images obtains depth images by a binocular vision, by a structured light, or by a time-of-flight camera. However, the depth images obtained by the above methods are not accurate enough, which affects a safety of autonomous driving.

BRIEF DESCRIPTION OF THE DRAWINGS

Implementations of the present disclosure will now be described, by way of embodiment, with reference to the attached figures.

DETAILED DESCRIPTION

Figure 1:
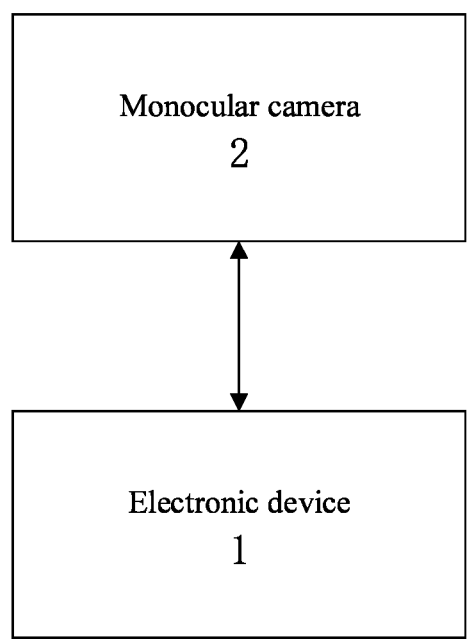
FIG. 1 is an environment diagram of one embodiment of a method for obtaining depth images for improved driving safety.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an environment of a method for obtaining depth images for improved driving safety. The method is applied at least one electronic device 1. The electronic device 1 connects to a monocular camera 2.

The electronic device 1 is a device that can automatically perform numerical calculation and/or information processing according to pre-set or stored instructions, and its hardware includes, but is not limited to, a microprocessor, an Application Specific Integrated Circuit (ASIC), a Field-Programmable Gate Array (FPGA), a Digital Signal Processor (DSP), an embedded device, etc.

The electronic device 1 can be any electronic product that can interact with a user, such as a personal computer, a tablet computer, a smart phone, a Personal Digital Assistant (PDA), a game console, an Internet Protocol Television (IPTV), a smart wearable device, etc.

In one embodiment, the electronic device 1 may also include a network device and/or a user device. The network device includes, but is not limited to, a single network server, a server group consisting of multiple network servers, or a cloud server consisting of a large number of hosts or network servers.

A network connected to the electronic device 1 includes, but is not limited to, the Internet, a wide area network, a metropolitan area network, a local area network, a Virtual Private Network (VPN), etc.

Figure 2:
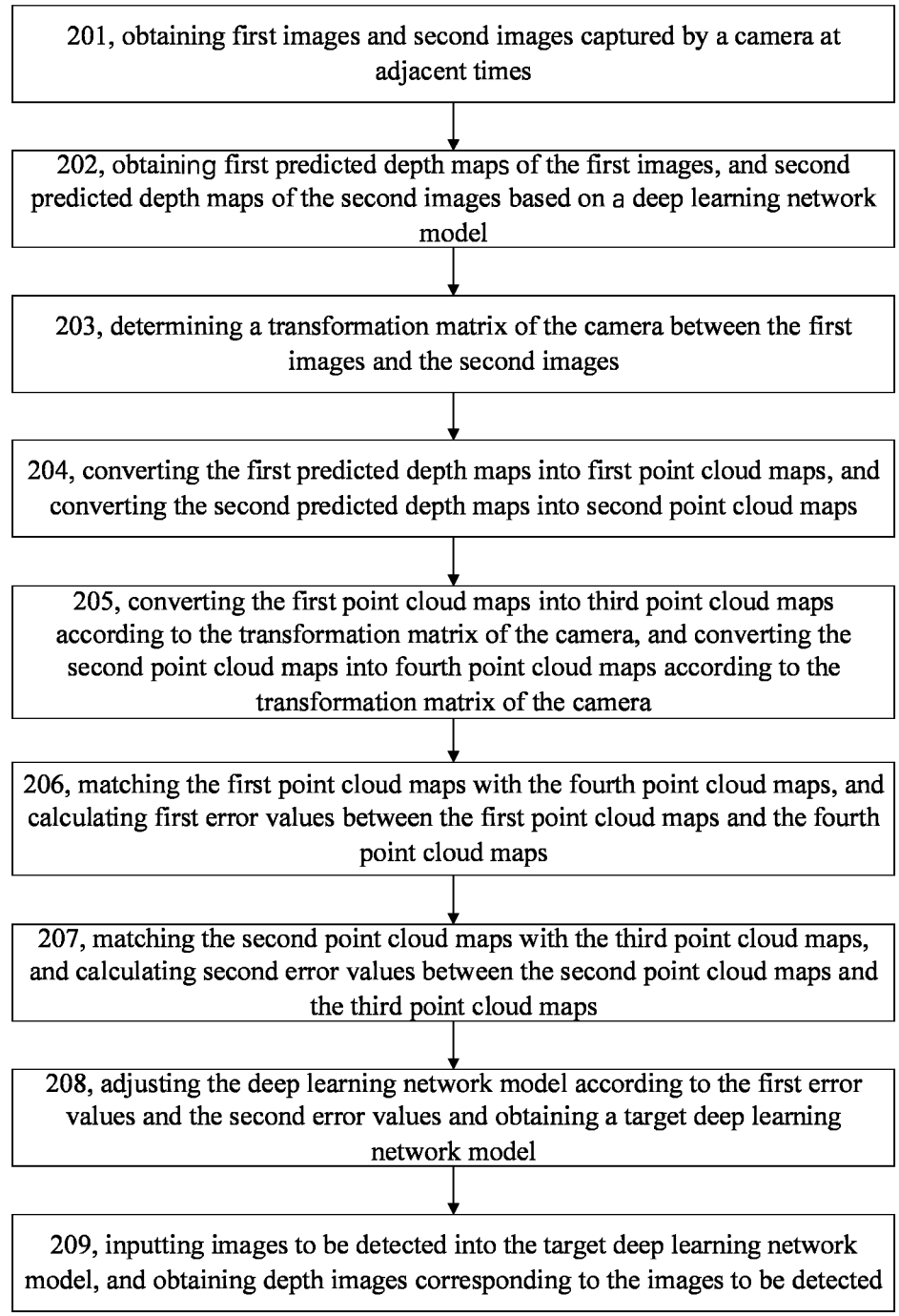
FIG. 2 is a flowchart of one embodiment of the method for obtaining depth images for improved driving safety according to the present disclosure.

FIG. 2 illustrates the method for obtaining depth images. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, obtaining first images and second images captured by a camera at adjacent times.

In one embodiment, the camera can be a monocular camera. The first images and the second images may be images of scenes in front of a vehicle captured by the monocular camera while the vehicle is driving. In one embodiment, adjacent times mean the camera is programmed to take images at a fixed time period, and the first and the second images are taken at adjacent points of time.

In one embodiment, the method includes: recording a video of the scene in front of the vehicle during driving by using a monocular camera, and obtaining images of adjacent frames in the video as the first images and the second images.

At block 202, obtaining first predicted depth maps of the first images, and second predicted depth maps of the second images based on a deep learning network model.

In one embodiment, the deep learning network model includes a depth estimation convolutional neural network and a pose estimation convolutional neural network.

In one embodiment, the obtaining of first predicted depth maps of the first images and second predicted depth maps of the second images based on a deep learning network model includes: obtaining the first predicted depth maps by processing the first images using the depth estimation convolutional neural network; obtaining the second predicted depth maps by processing the second images using the depth estimation convolutional neural network.

In one embodiment, the depth estimation convolutional neural network includes first input layers, first convolutional layers, and deconvolutional layers. In one embodiment, the method includes: inputting the first images into the depth estimation convolutional neural network by the first input layers of the depth estimation convolutional neural network; performing convolution operations on the first images by the first convolutional layers of the depth estimation convolutional neural network, and obtaining the feature maps of the first images; inputting the feature maps of the first images into the deconvolution layers, and performing deconvolution operations on the feature maps of the first images, and obtaining first dimensional feature maps; and mapping pixels in the first dimensional feature maps to depth values of the pixels, and generating the first predicted depth maps according to the depth values of the pixels, and outputting the first predicted depth maps.

In one embodiment, the method includes: inputting the second image into the depth estimation convolutional neural network by the first input layers; performing convolution operations on the feature maps of the second images by the convolution layers; inputting the feature maps of the second images into the deconvolution layers, and performing deconvolution operations on the feature maps of the second images, and obtaining second dimensional feature maps; and mapping pixels in the second dimensional feature maps to depth values of the pixels of the second dimensional feature, and generating the second predicted depth maps according to the depth values of the pixels of the second dimensional feature, and outputting the second predicted depth maps.

At block 203, determining a transformation matrix of the camera between the first images and the second images.

In one embodiment, determining the transformation matrix of the camera between the first images and the second images includes: processing the first images and the second images by using the pose estimation convolutional neural network, and obtaining the transformation matrix of the camera between the first images and the second images.

In one embodiment, the pose estimation convolutional neural network includes second input layers and second convolutional layers.

In one embodiment, the first images and the second images are input into the pose convolutional neural network by the second input layers, and the feature maps of the first images are obtained by performing convolution operations on the first images by the second convolutional layers, and the feature maps of the second images are obtained by performing convolution operations on the second images by the second convolutional layers. A pose information of the camera between the first images and the second images is obtained by using a camera pose estimation algorithm, and the pose information of the camera between the first images and the second images is regarded as the transformation matrix of the camera.

At block 204, converting the first predicted depth maps into first point cloud maps, and converting the second predicted depth maps into second point cloud maps.

In one embodiment, the first point cloud maps and the second point cloud maps are three-dimensional (3D) point cloud maps.

In one embodiment, converting the first predicted depth maps into the first point cloud maps includes: obtaining the first pixel coordinates from the first predicted depth maps, and obtaining the first point cloud maps according to the first pixel coordinates and an internal and external parameter matrix transformation formula of the camera. In one embodiment, converting depth maps to point cloud refers to converting an image coordinate system (for example pixel coordinate system) to a world coordinate system. Based on the internal and external parameter matrix transformation formula of the camera, the depth maps can be converted into the 3D point cloud maps, solving a problem of how to convert the depth maps into the point cloud maps. In one embodiment, the first pixel coordinates may be any pixel coordinates in the first predicted depth maps.

In one embodiment, the internal and external parameter matrix transformation formula of the camera is:

$$\begin{bmatrix} x \\ y \\ z \end{bmatrix} = D \begin{bmatrix} \frac{f}{dx} & 0 & 0 \\ 0 & \frac{f}{dy} & 0 \\ 0 & 0 & 1 \end{bmatrix} \begin{bmatrix} x_1 \\ y_1 \\ 1 \end{bmatrix}$$

where (x, y, z) are the world coordinates and represent the point cloud of the first pixel coordinates, f is a focal length of the camera, D is the depth values, and $(x_1, y_1)$ are the first pixel coordinates.

In one embodiment, a conversion of the second predicted depth maps to the second point cloud maps is similar to the above process of converting the first predicted depth maps to the first point cloud maps, which will not be described in detail in this application.

At block 205, converting the first point cloud maps into third point cloud maps according to the transformation matrix of the camera, and converting the second point cloud maps into fourth point cloud maps according to the transformation matrix of the camera.

In one embodiment, the transformation matrix of the camera includes a rotation matrix and a parallel movement matrix.

In one embodiment, the method further includes: obtaining coordinates of the points in the first point cloud maps and combining the coordinates of the points in the first point cloud maps into a first coordinate set; obtaining the coordinates of the points in the second point cloud maps and combining the coordinates of the points in the second point cloud maps into a second coordinate set; performing convolution multiplication operations on the rotation matrix, the parallel movement matrix, and the first coordinate set to obtain the third point cloud maps; performing the convolution multiplication operations on the rotation matrix, the parallel movement matrix, and the second coordinate set to obtain the fourth point cloud maps.

At block 206, matching the first point cloud maps with the fourth point cloud maps, and calculating first error values between the first point cloud maps and the fourth point cloud maps.

In one embodiment, the method performs point cloud matching on the first point cloud maps and the fourth point cloud maps, and calculates the first error values of the point cloud matching on the first point cloud maps and the fourth point cloud maps.

In one embodiment, the method includes: matching the first point cloud maps and the fourth point cloud maps according to the transformation matrix of the camera and an ICP algorithm formula. In one embodiment, the ICP algorithm formula is:

$$E(X,Y)=\Sigma_{t=1}(Rx_t+t-y_t)^2$$

where E(X, Y) is a result of matching the first point cloud maps and the fourth point cloud maps, R is the rotation matrix, $x_i$ is the ith point in the first point cloud maps, t is the parallel movement matrix, and $y_i$ is the ith point in the fourth cloud maps. The point cloud matching between the first point cloud maps and the fourth point cloud maps can be performed by the ICP algorithm formula.

In one embodiment, calculating the first error values between the first point cloud maps and the fourth point cloud maps includes: determining point pairs between the points in the first point cloud maps and the points in the fourth point cloud maps; calculating a first error by using a loss function according to the transformation matrix of the camera and the point pairs. In one embodiment, the loss function can be:

$$LOSS = \frac{1}{n}\sum_{j=1}^{n}|A_j - B_j|^2,$$

where LOSS is a value of the first error, n is a number of corresponding point pairs between the first point cloud maps and the fourth point cloud maps, $A_j$ is the jth point in the first point cloud maps, and $B_j$ is the jth point in the fourth point cloud image. $A_j$ and $B_j$ are a pair of the point pairs.

In one embodiment, determining point pairs between the points in the first point cloud maps and the points in the fourth point cloud maps includes: obtaining one point in the first point cloud maps and one point in the fourth point cloud maps; matching the point in the first point cloud maps with the point in the fourth point cloud maps according to the transformation matrix of the camera and the formula $E(X, Y)=\Sigma_{t=1}(Rx_t+t-y_t)^2$; selecting a number of first points from the first point cloud maps and selecting a number of second points from the second points cloud maps, and calculating a distance between the point in the first point cloud maps and the point in the fourth point cloud maps according to formula $$d = \frac{1}{m}\sum_{k=1}^{m}|A_k - B_k|^2,$$

and the first points and the second points, where d is the distance, m is the number of the first points or the second points, $A_k$ is the kth point in the first points, and $B_k$ is the kth point in the second points. When the distance is less than a preset threshold, it is determined that the point in the first point cloud maps and the point in the fourth point cloud maps are a pair of point pairs.

At block 207, matching the second point cloud maps with the third point cloud maps, and calculating second error values between the second point cloud maps and the third point cloud maps.

In one embodiment, the method includes: performing point cloud matching on the second point cloud maps and the third point cloud maps, and calculating the second error values of the point cloud matching between the second point cloud maps and the third point cloud maps.

In one embodiment, a method of performing point cloud matching on the second point cloud maps and the third point cloud maps and calculating the second error values is the same as the method for performing point cloud matching on the second point cloud maps and the third point cloud maps, and calculating the first error values, the present application will not repeat them here.

At block 208, adjusting the deep learning network model according to the first error values and the second error values and obtaining a target deep learning network model.

In one embodiment, the adjusting of the deep learning network model according to the first error values and the second error values and obtaining a target deep learning network model includes:

calculating a sum of the first error values and the second error values, and obtaining a training total error value of the deep learning network model;

adjusting configuration parameters of the deep learning network model until the training total error value cannot be further reduced, and obtaining the target deep learning network model, where the configuration parameters refer to initial configuration parameters in the depth estimation convolutional neural network and the pose estimation convolutional neural network.

For example, the configuration parameters include a number of layers of convolution layers in the depth estimation convolutional neural network and a number of layers of deconvolution layers in the depth estimation convolutional neural network, and a size of convolution kernels in the convolution layers and a size of convolution kernels in the deconvolution layers. In one embodiment, the configuration parameters also includes the number of layers of the convolutional layers and the size of the convolutional kernels in the convolutional layers in the pose estimation convolutional neural network.

At block 209, inputting images to be detected into the target deep learning network model, and obtaining depth images corresponding to the images to be detected.

In one embodiment, the images to be detected include images corresponding to a field of view of the vehicle during driving.

In one embodiment, the depth images corresponding to the image to be detected can be obtained by inputting the images to be detected into the target deep learning network model, hereby achieving depth images based on monocular images is realized.

The above embodiments are only specific embodiments of the present application, but a protection scope of the present application is not limited to these. For those of ordinary skill in the art, improvements can be made without departing from the inventive concept of the present application, but these all belong to the protection scope of the present application.

Figure 3:
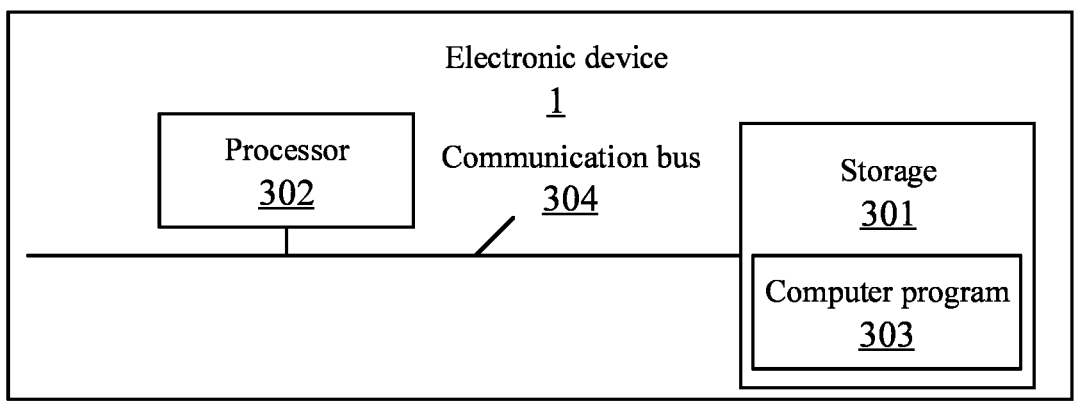
FIG. 3 is a schematic diagram of one embodiment of an electronic device employing the method according to the present disclosure.

FIG. 3 illustrates the electronic device 1. The electronic device 1 includes a storage 301, a processor 302, a computer program 303 stored in the storage 301, and at least one communication bus 304. In one embodiment, electronic device 3 can be an in-vehicle device. The in-vehicle device is provided on a vehicle, and the in-vehicle device may be an in-vehicle computer.

Those skilled in the art can understand that FIG. 3 shows only an example of the electronic device 1, and does not constitute a limitation on the electronic device 1. Other examples may include more or less components than those shown in the drawings, or have different combinations of components, or different components, for example, the electronic device 5 may also include input and output devices, network access devices, and the like.

The at least one processor 302 may be a Central Processing Unit (CPU), and may also be a general-purpose processor, a Digital Signal Processors (DSP), an Application Specific Integrated Circuit (ASIC), a Field-Programmable Gate Array (FPGA) or other programmable logic devices, discrete gate or transistor logic devices, discrete hardware components, etc. The at least one processor 302 can be a microprocessor or the at least one processor 302 can also be any conventional processor, etc. The at least one processor 302 is the control center of the electronic device 1, various interfaces and lines to connect various parts of the entire electronic device 1.

The storage 301 can be used to store the computer program 303, and the at least one processor 302 implements the electronic program by executing the computer program 303 stored in the storage 301 and calling up the data stored in the storage 301. The storage 301 may include a stored program area and a stored data area, wherein the stored program area may store an operating system, an application program required for at least one function (such as a sound playback function, an image playback function, etc.), etc. The storage data area may store data (such as audio data) created according to the use of the electronic device 1, etc. In addition, the storage 301 may include non-volatile storage such as a hard disk, an internal memory, a plug-in hard disk, a Smart Media Card (SMC), a Secure Digital (SD) card, a Flash Card (Flash Card), at least one disk storage device, flash memory device, or other non-volatile solid state storage device.

In one embodiment, the modules/units integrated in the electronic device 1 can be stored in a computer readable storage medium if such modules/units are implemented in the form of an independent product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM).

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for obtaining depth images for improved driving safety comprising:
   obtaining first images and second images captured by a camera;
   processing the first images by a deep learning network model, and obtaining first predicted depth maps of the first images;
   processing the second images by the deep learning network model, and obtaining second predicted depth maps of the second images;
   determining a transformation matrix of the camera between the first images and the second images;
   converting the first predicted depth maps into first point cloud maps, and converting the second predicted depth maps into second point cloud maps;
   converting the first point cloud maps into third point cloud maps according to the transformation matrix of the camera, and converting the second point cloud maps into fourth point cloud maps according to the transformation matrix of the camera;
   matching the first point cloud maps with the fourth point cloud maps, and calculating first error values between the first point cloud maps and the fourth point cloud maps;
   matching the second point cloud maps with the third point cloud maps, and calculating second error values between the second point cloud maps and the third point cloud maps;
   adjusting the deep learning network model according to the first error values and the second error values and obtaining a target deep learning network model; and
   inputting images to be detected into the target deep learning network model, and obtaining depth images corresponding to the images to be detected.

2. The method as claimed in claim 1, further comprising:
   obtaining first pixel coordinates from the first predicted depth maps, and obtaining the first point cloud maps according to the first pixel coordinates and an internal and external parameter matrix transformation formula of the camera;
   obtaining second pixel coordinates from the second predicted depth maps, and obtaining the second point cloud maps according to the second pixel coordinates and the internal and external parameter matrix transformation formula of the camera.

3. The method as claimed in claim 1, wherein the transformation matrix of the camera comprises a rotation matrix and a parallel movement matrix.

4. The method as claimed in claim 3, further comprising:
   obtaining coordinates of points in the first point cloud maps and combining the coordinates of the points in the first point cloud maps into a first coordinate set;
   obtaining the coordinates of the points in the second point cloud maps and combining the coordinates of the points in the second point cloud maps into a second coordinate set;
   performing convolution multiplication operations on the rotation matrix, the parallel movement matrix, and the first coordinate set, and obtaining the third point cloud maps;
   performing the convolution multiplication operations on the rotation matrix, the parallel movement matrix, and the second coordinate set, and obtaining the fourth point cloud maps.

5. The method as claimed in claim 4, further comprising:
   matching the first point cloud maps and the fourth point cloud maps according to the transformation matrix of the camera and a ICP algorithm formula $E(X,Y)=\Sigma_{i=1}(Rx_i+t-y_i)^2$, wherein $E(X, Y)$ is a matching result between the first point cloud maps and the fourth point cloud maps, R is the rotation matrix, $x_i$ is ith point in the first point cloud maps, t is the parallel movement matrix, and $y_i$ is the ith point in the fourth cloud maps.

6. The method as claimed in claim 1, wherein the deep learning network model comprises a depth estimation convolutional neural network and a pose estimation convolutional neural network.

7. The method as claimed in claim 6, further comprising:
performing convolution operations and deconvolution operations on the first images by using the depth estimation convolutional neural network, and obtaining the first predicted depth maps;
performing the convolution operations and the deconvolution operations on the second images by using the depth estimation convolutional neural network, obtaining the second predicted depth maps.

8. The method as claimed in claim 7, further comprising:
performing the convolution operations on the first images and the second images by using the pose estimation convolutional neural network, and obtaining the transformation matrix of the camera between the first images and the second images.

9. The method as claimed in claim 1, further comprising:
determining point pairs between points in the first point cloud maps and the points in the fourth point cloud maps;
calculating a first error by using a loss function according to the transformation matrix of the camera and the point pairs, wherein the loss function is $$LOSS = \frac{1}{n}\sum_{j=1}^{n} |A_j - B_j|^2,$$

LOSS is a value of the first error, n is a number of the point pairs, $A_j$ is the jth point in the first point cloud maps, and $B_j$ is the jth point in the fourth point cloud image, $A_j$ and $B_j$ are a pair of the point pairs.

10. The method as claimed in claim 1, further comprising:
calculating a sum of the first error values and the second error values, and obtaining a training total error value of the deep learning network model;
adjusting configuration parameters of the deep learning network model until the training total error value is no longer reduced, and obtaining the target deep learning network model.

11. An electronic device comprising:
a processor; and
a non-transitory storage medium coupled to the processor and configured to store a plurality of instructions, which cause the processor to:
obtain first images and second images captured by a camera;
process the first images by a deep learning network model, and obtain first predicted depth maps of the first images;
process the second images by the deep learning network model, and obtain second predicted depth maps of the second images;
determine a transformation matrix of the camera between the first images and the second images;
convert the first predicted depth maps into first point cloud maps, and convert the second predicted depth maps into second point cloud maps;
convert the first point cloud maps into third point cloud maps according to the transformation matrix of the camera, and convert the second point cloud maps into fourth point cloud maps according to the transformation matrix of the camera;
match the first point cloud maps with the fourth point cloud maps, and calculate first error values between the first point cloud maps and the fourth point cloud maps;
match the second point cloud maps with the third point cloud maps, and calculate second error values between the second point cloud maps and the third point cloud maps;
adjust the deep learning network model according to the first error values and the second error values and obtain a target deep learning network model;
input images to be detected into the target deep learning network model, and obtain depth images corresponding to the images to be detected.

12. The electronic device as claimed in claim 11, wherein the plurality of instructions are further configured to cause the processor to:
obtain first pixel coordinates from the first predicted depth maps, and obtain the first point cloud maps according to the first pixel coordinates and an internal and external parameter matrix transformation formula of the camera;
obtain second pixel coordinates from the second predicted depth maps, and obtain the second point cloud maps according to the second pixel coordinates and the internal and external parameter matrix transformation formula of the camera.

13. The electronic device as claimed in claim 11, wherein the transformation matrix of the camera comprises a rotation matrix and a parallel movement matrix.

14. The electronic device as claimed in claim 13, wherein the plurality of instructions are further configured to cause the processor to:
obtain coordinates of points in the first point cloud maps and combine the coordinates of the points in the first point cloud maps into a first coordinate set;
obtain the coordinates of the points in the second point cloud maps and combine the coordinates of the points in the second point cloud maps into a second coordinate set;
perform convolution multiplication operations on the rotation matrix, the parallel movement matrix, and the first coordinate set, and obtain the third point cloud maps;
perform the convolution multiplication operations on the rotation matrix, the parallel movement matrix, and the second coordinate set, and obtain the fourth point cloud maps.

15. The electronic device as claimed in claim 14, wherein the plurality of instructions are further configured to cause the processor to
match the first point cloud maps and the fourth point cloud maps according to the transformation matrix of the camera and a ICP algorithm formula $E(X,Y)=\Sigma_{i=1}(Rx_i+t-y_i)^2$, wherein $E(X, Y)$ is a matching result between the first point cloud maps and the fourth point cloud maps, R is the rotation matrix, $x_i$ is ith point in the first point cloud maps, t is the parallel movement matrix, and $y_i$ is the ith point in the fourth cloud maps.

16. The electronic device as claimed in claim 11, wherein the deep learning network model comprises a depth estimation convolutional neural network and a pose estimation convolutional neural network.

17. The electronic device as claimed in claim 16, wherein the plurality of instructions are further configured to cause the processor to
- perform convolution operations and deconvolution operations on the first images by using the depth estimation convolutional neural network, and obtain the first predicted depth maps;
- perform the convolution operations and the deconvolution operations on the second images by using the depth estimation convolutional neural network, obtain the second predicted depth maps.

18. The electronic device as claimed in claim 17, wherein the plurality of instructions are further configured to cause the processor to
- perform the convolution operations on the first images and the second images by using the pose estimation convolutional neural network, and obtain the transformation matrix of the camera between the first images and the second images.

19. The electronic device as claimed in claim 11, wherein the plurality of instructions are further configured to cause the processor to
- determine point pairs between points in the first point cloud maps and the points in the fourth point cloud maps;
- calculate a first error by using a loss function according to the transformation matrix of the camera and the point pairs, wherein the loss function is $$LOSS = \frac{1}{n}\sum_{j=1}^{n} |A_j - B_j|^2,$$

LOSS is a value of the first error, n is a number of the point pairs, $A_j$ is the jth point in the first point cloud maps, and $B_j$ is the jth point in the fourth point cloud image, $A_j$ and $B_j$ are a pair of the point pairs.

20. The electronic device as claimed in claim 11, wherein the plurality of instructions are further configured to cause the processor to
- calculate a sum of the first error values and the second error values, and obtain a training total error value of the deep learning network model;
- adjust configuration parameters of the deep learning network model until the training total error value is no longer reduced, and obtain the target deep learning network model.

* * * * *